UNITED STATES PATENT OFFICE.

JOSEPH MOSES WARD KITCHEN, OF EAST ORANGE, NEW JERSEY.

METHOD FOR THE UTILIZING OF SKIM-MILK AND IN MILK COMPOSITION.

1,125,692. Specification of Letters Patent. Patented Jan. 19, 1915.

No Drawing. Application filed January 9, 1913. Serial No. 740,963.

*To all whom it may concern:*

Be it known that I, JOSEPH MOSES WARD KITCHEN, a citizen of the United States, residing in the city of East Orange, county of Essex, State of New Jersey, have invented a new and Improved Method for the Utilizing of Skim-Milk and in Milk Composition.

The object of this invention is to so treat skim milk as to make of it a part of a nutritively well balanced form of healthful food for human beings in convenient practical form to use in commerce.

It is common practice to admix fluid skim milk and corn meal or other cereals in such balanced proportions as to render the composition nutritively desirable for feeding domestic animals; but the large water content in skim milk and its tendency to quickly deteriorate from fermentations, deprives large human populations of the advantages of using such food compositions. Furthermore, the fact of having had the butter fat removed from skim milk renders it not only unpalatable, but also ineffective from a nutritive point of view. Nevertheless, if skim milk is properly dehydrated and used in admixtures containing fatty constituents, and perhaps other constituents, it makes a very valuable food for human beings.

In view of the now recognized fact that certain of the protein constituents of maize are more or less lacking in nutritive availability, the desirability of adding to maize an available nutritive protein like skim milk that has not undergone marked chemical change from high heat, will be obvious. It should be noted that there are physiological virtues in milk that are not calculable as equivalents in the ordinary terms for energy or nutrition that are applicable to other foods. The skimming of fat from the milk in no way damages it for food so far as its protein, sugar, mineral salts and other nutritive constituents are concerned.

In carrying out my inventive idea, I do not confine myself to any special method of dehydrating skim milk and of making compositions therefrom. The general idea is to remove a sufficient amount of water from it and to secure through other food additions, a sufficient content of constituents that in the aggregate comprises sufficient fat to replace so far as is dietically desirable as much of the fat that has been skimmed from the milk as may be nutritively desirable. I also, in my idea of utilizing skim milk, may introduce constituents other than fats, such as starchy and flavoring matters.

It is obvious that the general idea of the invention may be carried out by mixing various constituents with a fluid skim milk, and then drying and pulverizing the mixture, or, by drying and pulverizing the ingredients separately and admixing such constituents in desired proportions.

The manner in which I carry out the purpose of the invention may be an important feature of the invention. Some methods are better than others. It is old to make compositions of whole milk and cereals; and to dry and pulverize such compositions, as through for example; the complicated method of making a dough of milk and meal, baking it, drying it and pulverizing the baked product. This method is too costly and unsatisfactory as to economic and dietary results. Another way is to mix a cereal with milk and then dehydrate the mixture to dryness and finally pulverize the dried product. This process is not very satisfactory inasmuch as the cereal becomes more or less dissolved in the milk, and a very hard horny mass is produced which is difficult to grind and which is difficult to digest. To overcome these defects, I may adopt several other methods. For example: I dry and pulverize skim milk separately and apart from any other food principle, by any known method, or by a special method that I have devised. I then add a definite proportion of the dried pulverized milk to a selected proportion of maize meal or other comminuted suitable food material such as ground chocolate or dextrinized barley, and then thoroughly admix the food constituents, which are afterward packaged. Such packages are preferably of an air and moisture proof character, and preferably, are subjected to a sterilizing heat after their sealing. Sometimes I double-seal the packages against external decomposing influences. Sometimes I use a paper package, and sometimes a hermetically sealed metal package, as in case of a condensed composition of skim milk and chocolate. In the latter instance, I merely condense the skim milk and add chocolate to it either before, during or after the condensing process; and then can the composition in the usual way; the closed can being sterilized after the can is sealed. I may use admixtures of dried skim milk and dried chocolate powder, with or without additions of sugar or other materials. In this instance, I prefer to use a paper package prepared from stiff cardboard in packing the composition, of a square, or of a rounded form. It should be noted here, that dried whole milk does not keep as well as dried skim milk, because of decompositions of the fat which occur in the whole milk. If, however, the fat is closely associated with the vegetable substance in which the fat originates, the objection as to poor keeping quality in the composition is overcome, the contained fat not becoming disassociated until after the composition is moistened and heated during its preparation for consumption. The original state of association protects the fat from oxidizing processes, and perhaps other decomposing activities.

I usually aim to secure the elimination of most of the water from skim milk by some process which leaves the dried milk and admixed other constitutents in the form of dry powder or fine granules; the admixed constitutents being added either during the process of drying the milk or after its drying, and being of nutritive matters such as corn meal, barley, other cereals or chocolate, in sufficient quantities to secure a desirable nutritive balance to the admixture. This especially applies in connection with adding fat containing food constitutents. In carrying out any method of performing this process, it may be accomplished in any one of various ways. I may gradually add to corn meal skim milk, and heat and dry the same during the process. This method I have specifically described and claimed in my copending application, Sr. No. 814,188 filed, January 24th 1914. I may add some desirably flavored materials to the skim milk, such as chocolate, and then concentrate the several materials. If the admixed materials are reduced to a substantially dry condition, I preferably pack the same in some form of paper package that more or less prevents atmospheric infections of, and moisture from entering the package. I preferably subject any package of such compositions to sterilizing temperatures after its sealing. Inasmuch as I usually add more or less in some form of cereal to the skim milk, if the preparation is to be marketed in dry form, I preferably use a cereal that is rich in vegetable fats; but not having fat in such large proportions as to incite non-organic decomposition in the package. If I add fats that would be subject to such decompositions, I hermetically seal such packages; using preferably a metal container for the admixed ingredients. This is particularly the case, if I add chocolate as an ingredient to incompletely dehydrated skim milk.

The present invention differs from the prior art inasmuch that I recognize the desirability of preparing such compositions as will have a satisfactory, nutritively well balanced content of the several ingredients. To secure my aim I perform a combined series of steps or processes that must be coactively carried out in full to secure my aimed for result, some of which individual steps may have been individually and singly performed in other instances but without securing the advantage of my particular combination of steps or processes.

Subject matter is herein disclosed which is not herein claimed; but which is claimed in one or more of the following of my copending applications, viz; that which particularly relates to special methods of dehydrating milk and other fluids, in Sr. No. 814,188, filed Jan. 24, 1914; and that which particularly relates to compositions of cocoa and skim milk, in Sr. No. 872,707, filed November 18, 1914.

What I claim as new is:

1. The method herein described, which consists in, admixing pulverized cereals with dehydrated skim milk, said pulverized cereal having a fat content at least relatively equal to the butter fat removed from the milk in its skimming.

2. The method herein described, which consists in, drying and pulverizing skim milk and a food material rich in vegetable fat, said material having its fat naturally associated with the other constitutents of the material and being present in suitable proportion to gove the admixed materials a fat content approximately equivalent to the butter fat removed from the milk.

3. As a new food product, a dry comminuted composition of skim milk and maize or Indian corn, said compound having sufficient proportions of skim milk and maize therein to give the dried composition a definite well balanced economic nutritive ratio of proteids and fats between its several constitutents.

4. The food product herein described, which consists of an admixture of dried pulverized skim milk and ground maize, the admixture having a desired nutritive balance.

JOSEPH MOSES WARD KITCHEN.

Witnesses:
Geo. L. Wheelock,
Beatrice Mirvis.